United States Patent
Koschmieder et al.

(10) Patent No.: US 11,513,331 B2
(45) Date of Patent: Nov. 29, 2022

(54) DEVICE FOR DECOUPLING PART OF THE RADIATION OF AN OBSERVATION BEAM PATH OF BINOCULARS THAT IS FREELY SELECTABLE AT ANY TIME

(71) Applicant: Carl Zeiss Meditec AG, Jena (DE)

(72) Inventors: Ingo Koschmieder, Jena (DE); Dietrich Martin, Jena (DE); Günter Link, Lehesten (DE); Lothar Müller, Ottendorf (DE)

(73) Assignee: Carl Zeiss Meditec AG, Jena (DE)

( * ) Notice: Subject to any disclaimer, the term of this patent is extended or adjusted under 35 U.S.C. 154(b) by 299 days.

(21) Appl. No.: 16/652,179

(22) PCT Filed: Sep. 11, 2018

(86) PCT No.: PCT/EP2018/074361
§ 371 (c)(1),
(2) Date: Mar. 30, 2020

(87) PCT Pub. No.: WO2019/063276
PCT Pub. Date: Apr. 4, 2019

(65) Prior Publication Data
US 2020/0301123 A1    Sep. 24, 2020

(30) Foreign Application Priority Data
Sep. 29, 2017  (DE) .................... 10 2017 217 378.5

(51) Int. Cl.
| | | |
|---|---|---|
| G02B 21/22 | (2006.01) | |
| G02B 25/00 | (2006.01) | |
| G02B 21/36 | (2006.01) | |

(52) U.S. Cl.
CPC .......... *G02B 21/22* (2013.01); *G02B 21/361* (2013.01); *G02B 21/362* (2013.01); *G02B 25/001* (2013.01)

(58) Field of Classification Search
CPC ........ G02B 21/20; G02B 21/22; G02B 21/24; G02B 21/36; G02B 21/361; G02B 21/362;
(Continued)

(56) References Cited

U.S. PATENT DOCUMENTS

2008/0100893 A1*  5/2008  Knuenz .............. G02B 27/144
                                                              359/196.1

FOREIGN PATENT DOCUMENTS

| DE | 26 31 118 A1 | 3/1978 |
|---|---|---|
| DE | 34 32 635 A1 | 4/1985 |

(Continued)

OTHER PUBLICATIONS

PCT International Report on Patentability for PCT/EP2018/074361, dated Apr. 9, 2020, 7 pages.
(Continued)

*Primary Examiner* — Mustak Choudhury
(74) *Attorney, Agent, or Firm* — DeWitt LLP

(57) ABSTRACT

A device for outcoupling a portion of the radiation of an observation beam path of a binocular eyepiece for documentation or co-observation that is freely selectable at any time. For the outcoupling, a rotatable supporting unit, the axis of rotation of which is parallel to the axes of the observation beam paths, is arranged in the housing having the binocular eyepiece. Three optical elements are arranged on this supporting unit such that an outer and the middle optical element and, after rotation of the supporting unit, the middle and the other outer optical element are each located in one of the observation beam paths. Here, the two outer optical elements have a beam-splitting effect and outcouple a portion of the observation radiation into a common documentation beam path.

20 Claims, 3 Drawing Sheets

(58) Field of Classification Search
CPC .... G02B 25/001; G02B 27/10; G02B 27/144; G02B 26/0816
See application file for complete search history.

(56) References Cited

FOREIGN PATENT DOCUMENTS

| | | | |
|---|---|---|---|
| DE | 19504427 A1 * | 9/1995 | ............ A61B 3/132 |
| DE | 196 22 357 A1 | 12/1997 | |
| DE | 103 56 154 B4 | 7/2005 | |
| DE | 102006050846 A1 | 5/2008 | |
| DE | 10 2013 216 475 A | 3/2014 | |
| DE | 102015214082 A1 | 8/2016 | |
| EP | 1235094 A2 | 8/2002 | |
| EP | 1 486 813 A | 12/2004 | |
| EP | 1538471 A1 | 6/2005 | |
| JP | H08-101 346 A | 4/1996 | |
| WO | WO-2018210979 A1 * | 11/2018 | ............ A61B 3/132 |

OTHER PUBLICATIONS

International Search Report and Written Opinion for PCT/EP2018/074361, dated Dec. 20, 2018, 13 pages.
English translation of International Search Report for PCT/EP2018/074361, dated Dec. 20, 2018, 2 pages.
German Search Report for 10 2017 217 378.5 dated Feb. 6, 2018, 10 pages.

* cited by examiner

DEVICE FOR DECOUPLING PART OF THE RADIATION OF AN OBSERVATION BEAM PATH OF BINOCULARS THAT IS FREELY SELECTABLE AT ANY TIME

RELATED APPLICATIONS

This application is a National Phase entry of PCT Application No. PCT/EP2018/074361 filed Sep. 11, 2018, which application claims the benefit of priority to DE Application No. 10 2017 217 378.5, filed Sep. 29, 2017, the entire disclosures of which are incorporated herein by reference.

TECHNICAL FIELD

Embodiments of the present invention relate to a technical solution with which the beam path, to be used for a photographic documentation or a co-observation apparatus, of an optical appliance having a binocular eyepiece can be freely selected at any time and can also be changed, without structural changes being necessary.

BACKGROUND

Although numerous solutions are available from the prior art, which relate for example to a changing apparatus for magnification stages or illumination variants, solutions for choosing the observation beam path, to be used for documentation, of an optical appliance having a binocular eyepiece are not widely known.

For this purpose, DE 26 31 118 A1 describes a binocular tube for microscopes, at the top side of which a neck is provided for attaching additional appliances, such as a camera. By means of a deflection prism having partially transmissive mirror surfaces, the main beam path is divided in the direction of the neck and in the direction of the binocular tube. In this solution, a detection beam path is thus not outcoupled from an observation beam path but already before, from the main beam path. For this, an optical unit and a triple mirror are provided.

A changing device for switching the operation types of a microscope tube between the positions of observing, recording and simultaneously observing and recording is known from DE 196 22 357 A1. Three optical elements are provided for this purpose, namely a completely reflecting first element, a partially transmissive second element and a compensating element for compensating the optical path length as a third optical element. The first and the second element are fixed on separate guide carriages, which are arranged displaceable to one other. According to the desired work position, the optical elements are driven in or out of the beam path, by being displaced linearly along guide rods.

Both solutions have neither the possibility of selecting the observation beam path to be used for outcoupling, nor is changing the used observation beam path possible.

Many components used for documentation on stereoscopic observation appliances use one of the two observation beam paths, however. According to the construction, an observation beam path is mechanically set such that there is no possibility to switch between the two observation beam paths. The latter is disadvantageous if this fixed specified channel does not correspond to the dominant eye of the user, since the visual impression of this eye determines the subjective view of the observer. In the non-corresponding case, the user has the impression that the documented image impression does not correspond to what is visually perceived.

Some of the built-in components here allow different integrations in the system, e.g. 0° or 180° with respect to the observation beam path, such that in this phase of the set-up it can be decided which of the two observation beam paths is used for outcoupling. There is certainly a possibility to match the system to one's personal requirements in this phase, however, after this decision the set-up is predetermined again and cannot be changed without reconstructing it once again.

A changing device for optical elements in stereo microscopes is described in DE 103 56 154 B4. With this rotatable changing device, a pair of optical elements is insertable in both observation beam paths of a stereo microscope respectively, wherein the spacing of the elements of each pair corresponds to the stereo basis of the stereo channel. According to the invention, a plurality of optical elements are arranged in a circle shape, next to one another, around the center of the changing device, wherein the center of the changing device is laterally displaced toward the stereo basis of the stereo channel on the changing device. With an arrangement of 5 optical elements, for example three work positions can thus be set, which can be described as "stereo observation", "50% stereo observation and 50% documentation" and "100% documentation and single-channel observation". Even though the solution proposed here has the possibility to vary (50% or 100%) the outcoupling for documentation purposes or switch it off, a selection of the observation beam path to be used for the outcoupling is not provided. In addition, a considerable structural space is required for the switching proposed here, which restricts the structural space available for the optical design or the mechanical construction. This leads in turn to an increase of the modified volume for the whole system, which disadvantageously impacts the usability of such a system.

SUMMARY OF THE INVENTION

A switching between the two observation beam paths by the user in the form of a simply actuated mechanism is not provided by any of the known solutions.

Embodiments of the present invention make it possible to select or to change the beam path, to be used for a photographic documentation or other similar outcoupling, of an optical appliance having a binocular eyepiece freely at any time, without structural changes being necessary for this. The selection should be simple and also be possible while observing through the binocular eyepiece.

According to example embodiments, a device for outcoupling a portion of the radiation of an observation beam path of a binocular eyepiece is freely selectable at any time, in that a rotatable supporting unit, the axis of rotation of which is parallel to the axes of the observation beam paths, is arranged in the housing having the binocular eyepiece, in that three optical elements are arranged offset on this supporting unit, wherein an outer and the middle optical element are each located in one of the observation beam paths, in that, after rotation of the supporting unit, the middle and the other outer optical element are each located in one of the observation beam paths and in that the two outer optical elements have a beam-splitting effect and are arranged on the supporting unit such that, for the case that they are located in one of the observation beam paths, a portion of the observation radiation is outcoupled into a common documentation beam path.

According to example embodiments of the invention, the observation beam path used for outcoupling is changed by means of rotating the supporting unit, wherein the rotation can be mechanical or also motorized.

The optical elements having a beam-splitting effect outcouple a portion of the observation radiation into a common documentation beam path, wherein the proportion of the outcoupled radiation is for example, up to 80%, in another example, up to 50%.

According to an example embodiment the invention, the optical elements arranged on the rotatable supporting unit can also be used to incouple data by means of an additional display, arranged opposite the common detection beam path. In- and outcoupling occur independently of one another here, but can also be combined.

Additionally, according to an example embodiment, the proposed device can be supplemented with spectrally-dependent filters and/or fixed or variable stops, which are arranged in the observation beam path and/or in the documentation beam path respectively and are selectively insertable into the respective beam path.

The proposed technical solution is provided in particular for outcoupling image data from a freely selectable observation beam path of a binocular eyepiece into a documentation beam path. However, the device according to the invention is suitable for all optical systems which have a binocular eyepiece, for which beam-splitting of one of the observation beam paths is necessary and the observation beam path to be used for the outcoupling must be variable.

BRIEF DESCRIPTION OF THE DRAWINGS

The invention is described in more detail below on the basis of exemplary embodiments. In this respect.

DETAILED DESCRIPTION

Figure 1:
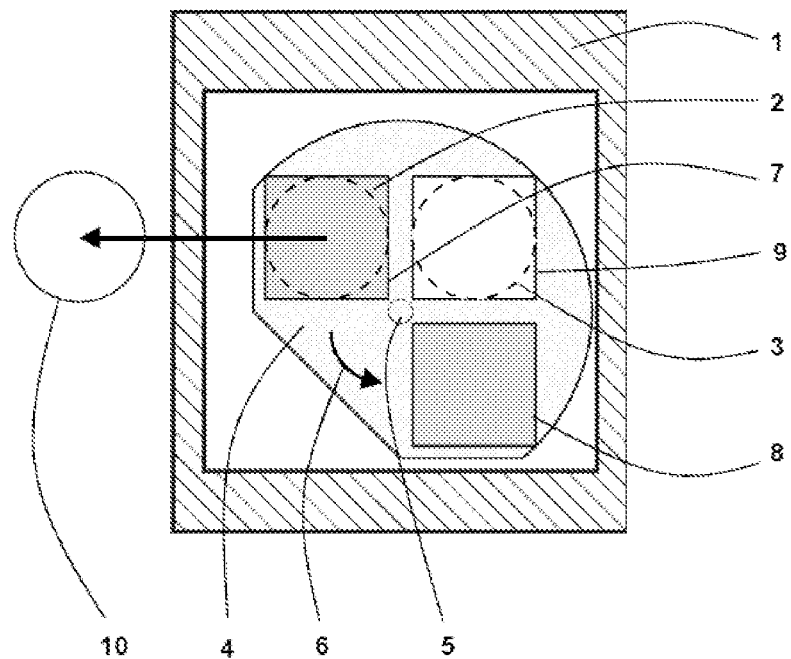
FIG. 1: is a schematic illustration of the solution for outcoupling from the left observation beam path of a binocular eyepiece.
Figure 1:
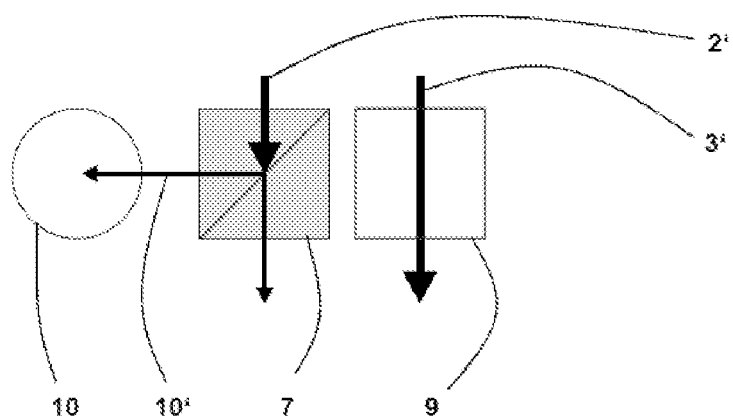

The proposed device outcouples a portion of the radiation of an observation beam path of a binocular eyepiece that is freely selectable at any time.

According to the invention, for this purpose a rotatable supporting unit, the axis of rotation of which is parallel to the axes of the observation beam paths, is arranged in the housing having the binocular eyepiece. Three optical elements are arranged offset on this supporting unit, embodied for example as a plate, wherein an outer and the middle optical element are each located in one of the observation beam paths and, after rotation of the supporting unit, the middle and the other outer optical element are each located in one of the observation beam paths. Here the two outer optical elements have a beam-splitting effect and are arranged on the supporting unit such that, for the case that they are located in one of the observation beam paths, a portion of the observation radiation is outcoupled into a common documentation beam path.

With the invention it is possible to simply and quickly select one of the two observation beam paths for outcoupling a documentation beam path, by a beam-splitting optical element being swiveled into the selected observation beam path by means of rotating the plate, while an optical element without an optical effect is swiveled in the other observation beam path.

The first example embodiment relates to the rotatable supporting unit, for example embodied as a plate, on which the three optical elements are arranged offset by 90°, at its outer edge. Here an outer and the middle optical element are located in one of the observation beam paths respectively and, after rotating the plate by 90°, the middle and the other outer optical element are located in one of the observation beam paths respectively.

This thus results in a rotation range of +/−90° for the rotatable plate. In its end positions, the rotatable plate has abutments or latching positions. The two end positions should be haptically clearly recognizable to the operator here.

For example, the switch mechanism can be embodied in an advantageous way such that, after an initial movement, the rotatable plate moves on its own into one of the two (stable) end positions, i.e. that the adjustment range is designed bistably.

Since the plate is only occupied by three optical elements, the unoccupied surface of the preferably circle-shaped plate can be cut off, thereby allowing substantial reduction of the necessary structural space.

The rather small rotation range of +/−90° makes manual rotation possible. For this purpose there is an actuating element in the form of a lever, which directly or indirectly engages the rotatable plate. Chains, cables or push rods are conceivable as an indirect connection between the lever and the rotatable plate. Here, it is recognizable by observation of the position of the lever, which observation beam path is currently being outcoupled from.

According to an example variant there is an actuating element in the form of a switch, which is connected to a motorized drive arranged at the rotatable plate.

Firstly, this has the advantage that the switch can be positioned at an ergonomically favorable point. Secondly, when the switching between the two outcoupling variants happens sufficiently quickly, this has the possibility to generate stereo recordings of the test object. For this purpose, image data outcoupled successively from both observation beam paths would be recorded and filed in data storage, wherein each of the images is marked as part of a pair of stereo images. In this variant, it should preferably also be recognizable, which observation beam path is currently being outcoupled from. In this case, this can happen by application of the position of the switch or a separate display.

The second example embodiment relates to the elements having a beam-splitting effect, which are embodied as a beam-splitter cube and can consist of glass, plastic or another optically transparent material.

In another embodiment variant, the elements having a beam-splitting effect are embodied as a plane-parallel plate.

For example, the embodiment is as a beam-splitter cube, since in this case there is no beam misalignment. However, for very critical applications, the use of an optical element without an optical effect in the observation beam path not used for outcoupling is absolutely necessary.

In cases in which a beam misalignment in the total optical system can be tolerated, the use of plane-parallel plates is possible.

Independent of their embodiment variants, the proportion of the radiation outcoupled from an observation beam path into a common documentation beam path is up to 80%, preferably up to 50%.

According to an example embodiment, the common documentation beam path encloses an angle of 90° with the observation beam paths.

The common documentation beam path for example has a camera for recording image data, wherein the documentation beam path can still be bent away by means of one or more mirror elements for technical and/or ergonomic reasons and can include further optical elements.

The third example embodiment relates to the middle optical component arranged between the two outer optical elements, which has no optical effect.

This optical element without an optical effect exclusively compensates different optical path lengths between the two observation beam paths.

For example, in a way corresponding to the elements having a beam-splitting effect this optical element is embodied as a cube or a plane-parallel plate.

In the case of the embodiment as plane-parallel plates, the optical element without an optical effect would also be embodied as a plane-parallel plate or could potentially be omitted, under consideration of the thus associated reduction in quality.

In one example variant, the middle optical component arranged between the two outer optical elements has a beam-attenuating effect.

On account thereof, it is possible for the optical image impressions of both observation beam paths to match one another. Here the attenuation need not correspond exactly to the percentage proportion of the outcoupling, but can be smaller or also greater, since the visual impression of brightness has a relatively large tolerance.

For this purpose, FIG. 1 shows a schematic illustration of the solution for outcoupling image data from the left observation beam path of a binocular eyepiece.

In this case, the upper image of FIG. 1 shows a section illustration perpendicular to the optical observation axes.

In the device according to the invention, arranged in the housing 1 having (not illustrated) a binocular eyepiece is a rotatable plate 4, the axis of rotation 5 of which is parallel to the axes of the two observation beam paths 2 and 3 of the binocular eyepiece. In this case, the possible rotational movement of the plate 4 is documented with the arrow 6. Three glass cubes 7, 8 and 9 are arranged offset on the plate 4, wherein the glass cubes 7 and 9 are located in one of the observation beam paths 2 and 3 respectively.

The glass cube 7 located in the observation beam path 2 is embodied as a beam-splitter cube and outcouples a portion of the radiation of the observation beam path 2 into the common documentation beam path 10. The glass cube 9 located in the observation beam path 3 has no optical effect.

The lower image of FIG. 1 shows a schematic illustration of the outcoupling, seen perpendicularly from above with respect to the plane spanned by the observation beam paths.

A portion of the radiation 2' of the observation beam path 2 is outcoupled as a documentation beam 10' into a documentation beam path 10 by the beam-splitter cube 7 located in the observation beam path 2. The beam-splitter cube 7 is arranged on the plate 4 such that the radiation 10' is outcoupled to the left into the documentation beam path 10 at an angle of 90°. The radiation 3' of the observation beam path 3 is not affected by the glass cube 9 located in the observation beam path 3. The thickness of the arrows used for the illustration of the radiations 2', 3' and 10' should simultaneously exemplarily document the energy flux.

Figure 2:
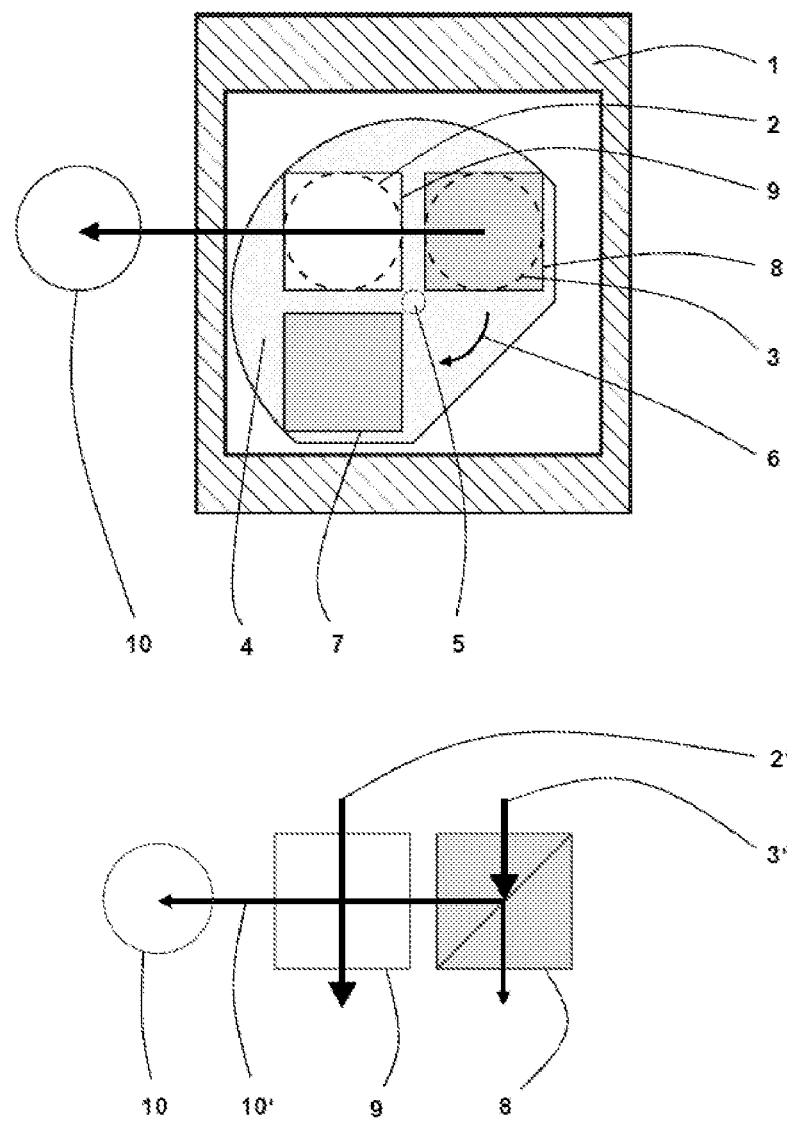
FIG. 2: is a schematic illustration of the solution for outcoupling from the right observation beam path of a binocular eyepiece.

In contrast to FIG. 1, FIG. 2 shows a schematic illustration of the solution for outcoupling image data not from the observation beam path from the left, but from the observation beam path from the right of a binocular eyepiece.

For this purpose, the plate 4 was rotated counter-clockwise by 90°. By this rotation:
- the beam-splitter cube 7 was swiveled out from the observation beam path 2,
- the glass cube 9 was swiveled out from the observation beam path 3 and into the observation beam path 2, and
- the beam-splitter cube 8 was swiveled into the observation beam path 3.

The upper image of FIG. 2 in turn shows a section illustration along the optical observation axes.

In the device according to the invention, arranged in the housing 1 having (not illustrated) a binocular eyepiece is a rotatable plate 4, the axis of rotation 5 of which is parallel to the axes of the two observation beam paths 2 and 3 of the binocular eyepiece. In this case, the possible rotational movement of the plate 4 is documented with the arrow 6. Three glass cubes 7, 8 and 9 are arranged offset on the plate 4, wherein the glass cubes 8 and 9 are located in one of the observation beam paths 2 and 3 respectively.

While the glass cube 9 located in the observation beam path 2 has no optical effect, the glass cube 8 located in the observation beam path 3 is embodied as a beam-splitter cube and outcouples a portion of the radiation of the observation beam path 3 into the common documentation beam path 10.

The lower image of FIG. 2 shows in turn a schematic illustration of the outcoupling, seen perpendicularly from above with respect to the plane spanned by the observation beam paths.

A portion of the radiation 3' of the observation beam path 3 is outcoupled as a documentation beam 10' into the documentation beam path 10 by the beam-splitter cube 8 located in the observation beam path 3. The beam-splitter cube 8 is arranged on the plate 4 such that the radiation 10' is outcoupled to the left into the documentation beam path 10 likewise at an angle of 90°. The radiation 2' of the observation beam path 2 is not affected by the glass cube 9 located in the observation beam path 2. The thickness of the arrows used for the illustration of the radiations 2', 3' and 10' should simultaneously exemplarily document the energy flux here also.

Since the light path is in general reversible, all described outcoupling variants can also be used to incouple information into an optical system.

When exclusively using the device, the beam-splitters must then be rotated by 180° such that the light energy is deflected toward the observer.

According to a fourth example embodiment, there is in addition a display for incoupling data, images or information, which is arranged opposite the common documentation beam path. In- and outcoupling take place independently of one another here, but can also be combined.

In this variant, it is particularly advantageous that the optical element having a beam-splitting effect, which is located in the observation beam path respectively and realizes the outcoupling of the documentation radiation, is used for incoupling the data, images or information.

Any desired information can be fed into one of the observation beam paths by use of this display.

Since only a portion of the light energy is deflected in the direction of the observer by the beam-splitter and the remaining portion passes through the beam-splitting element in the imaging direction, it is sensible that feeding information in is briefly switched off while recording image data in the documentation beam path, wherein the switching off can be synchronized with the image recording. On account thereof, possible superpositions of the image to be documented with the information fed in are prevented.

Furthermore it can be shown by use of the display, for example, which of the observation beam paths is currently being outcoupled from and also fed into. This is sensible whenever the switching between the observation beam paths is motorized and there is a lever, the position of which shows this information.

Figure 3:
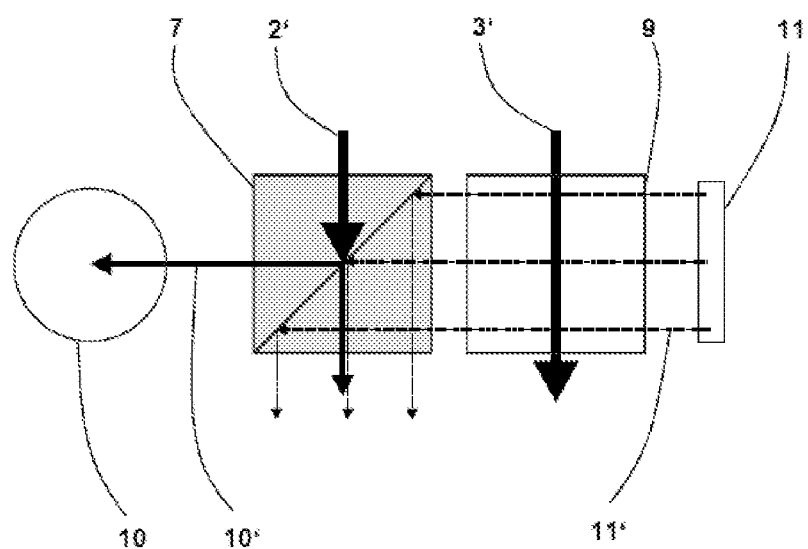
FIG. 3: is a schematic illustration of the solution for out- and incoupling from the/into the left observation beam path of a binocular eyepiece.

In this respect, FIG. 3 shows a schematic illustration of the inventive solution for outcoupling and feeding-in from the/into the left observation beam path of a binocular eyepiece.

The schematic illustration of the outcoupling and feeding-in corresponds to the lower images of FIGS. 1 and 2, in which the line of vision is oriented perpendicularly from above onto the plane spanned by the observation beam paths.

A portion of the radiation 2' of the observation beam path 2 is outcoupled as a documentation beam 10' into a documentation beam path 10 by the beam-splitter cube 7 located in the observation beam path 2. The beam-splitter cube 7 is arranged on the plate 4 such that the radiation 10' is outcoupled to the left into the documentation beam path 10 at an angle of 90°. The radiation 3' of the observation beam path 3 is not affected by the glass cube 9 located in the observation beam path 3.

The information generated by the display 11 is fed as radiation 11' into the observation beam path 2 by the beam-splitter cube 7. In this case, the splitter layer of the beam-splitter cube 7 undertakes both the outcoupling of the radiation 2' from the, and the feeding of the radiation 11' into the, observation beam path 2.

The radiation 11' generated by the display 11 is also not affected by the glass cube 9 located in the observation beam path 3.

The thickness of the arrows used for the illustration of the radiations 2', 3', 10' and 11' should simultaneously exemplarily document the energy flux here also. The radiation 11' fed into the observation beam path 2 is illustrated as a dashed line.

The schematic illustration of the inventive solution shown in FIG. 3 also applies analogously for the outcoupling and feeding-in from the/into the right observation beam path of a binocular eyepiece. Since the outcoupling and the feeding-in occur from the and into the observation beam path 3, these functions are undertaken by the splitter layer of the beam-splitter cube 8.

According to a further example embodiment, the inventive device for outcoupling image data from a selectable observation beam path of a binocular eyepiece can be supplemented by spectrally-dependent filters, which are arranged in the observation and/or in the documentation beam path and are selectively insertable into the beam path. The spectrally-dependent filters are preferably arranged for this purpose on a filter wheel or similar, which has a motorized drive.

With the aid of the spectrally-dependent filters, wavelength-specific observation situations can be generated and associated image recordings documented. In this case it is even possible to generate a different spectral characteristic in the observation beam path than in the documentation beam path. It is also possible to realize pseudo-multispectral, i.e. sequential, recordings by use of a motorized adjustment of the spectrally-dependent filters.

Furthermore, the inventive device can be supplemented by use of fixed and/or variable stops, which are likewise arranged in the observation and/or documentation beam path and are selectively insertable into the beam path. The fixed and/or variable stops are preferably also arranged on a wheel or similar, which has a motorized drive.

In this case, both a fixed, step-wise adjustable diameter or a continuously adjustable iris stop are provided as stops, by use of which the depth of field of the observation situations and associated recordings can be varied.

When the stops are only arranged in the documentation beam path, the depth of field can only be varied for the documentation beam path. But in this case the identity between the visual observation and the documented image is eliminated. These stops can also be used for controlling the exposure of the image recording. For this purpose, they should be easy to operate.

According to a last example embodiment, the three optical components can be embodied as a monolithic block having the correspondingly necessary optically effective surfaces. The rotatable plate can be dispensed with here, if the monolithic block is rotated as a whole.

This variant has the advantage that boundary surface losses can be avoided and the alignment complexity substantially reduced.

With the solution according to example embodiments of the invention, a device, with which a portion of the radiation of an observation beam path of a binocular eyepiece that is freely selectable at any time can be outcoupled is provided. The beam path, to be used for a photographic documentation, of an optical appliance having a binocular eyepiece can be freely selected and changed here, without structural changes being necessary for this.

The selection is extremely simple to realize with the present solution and also possible while observing through the binocular eyepiece, for the purpose of which the operator does not need to turn his view away from the binocular eyepiece.

Although the proposed solution is for example provided for outcoupling image data from an ophthalmological appliance, it can however be used for all optical systems, which have a binocular eyepiece, for which beam-splitting of one of the observation beam paths is necessary and the observation beam path to be used for the outcoupling must be variable.

The arrangement according to the invention of only three optical elements and the thus associated multiple use of the optical element without an optical effect make a very compact device possible.

Compared to similar adjustment devices known from the prior art, the present solution requires a substantially smaller structural space. This is of advantage in particular for such appliances, in which the user must also be able to look at his object past the appliance, which for example is the case for a slit-lamp.

It is furthermore particularly advantageous that a very simple and quick change of the observation beam path used for outcoupling is possible by use of the rotating adjustment.

The invention claimed is:

1. A device for outcoupling a portion of the radiation of an observation beam path of a binocular eyepiece that is freely selectable at any time, comprising:
   a rotatable supporting unit, an axis of rotation thereof being parallel to axes of observation beam paths of the eyepiece;
   wherein the rotatable supporting unit is arranged in a housing having the binocular eyepiece;
   wherein three optical elements are arranged offset on the supporting unit;

wherein a first outer optical element and a middle optical element are each located in one of the observation beam paths;

wherein after rotation of the supporting unit, the middle and a second outer optical element are each located in one of the observation beam paths;

wherein the first outer optical element and second outer optical element have a beam-splitting effect and are arranged on the supporting unit such that, for the case that they are located in one of the observation beam paths, a portion of the observation radiation is outcoupled into a common documentation beam path; and whereby each of the first outer optical element, the second outer optical element and the middle optical element are offset from the axis of rotation and whereby selectable outcoupling of either of the observation beam paths for a right binocular eyepiece or a left binocular eyepiece to the common documentation beam path is enabled.

2. The device as claimed in claim 1, wherein the three optical elements are arranged offset, the rotatable supporting unit has a rotation range of +/−90° and has abutments or latching positions in end positions thereof.

3. The device as claimed in claim 1, further comprising an actuating element with or without gears arranged at the rotatable supporting unit.

4. The device as claimed in claim 1, further comprising an actuating element in the form of a switch, which is connected to a motorized drive arranged at the rotatable supporting unit.

5. The device as claimed in claim 1, wherein an operating mechanism of the rotatable supporting unit is structured bistably.

6. The device as claimed in claim 1, wherein the supporting unit comprises a plate.

7. The device as claimed in claim 1, wherein the first and second outer optical elements having a beam-splitting effect comprise beam-splitter cubes or plane-parallel plates.

8. The device as claimed in claim 1, wherein the optical elements having a beam-splitting effect outcouple a portion of the observation radiation into a common documentation beam path, wherein a proportion of the outcoupled radiation is up to 80%.

9. The device as claimed in claim 1, wherein the optical elements having a beam-splitting effect outcouple a portion of the observation radiation into a common documentation beam path, wherein a proportion of the outcoupled radiation is up to 50%.

10. The device as claimed in claim 1, wherein the common documentation beam path encloses an angle of 90° with the observation beam paths.

11. The device as claimed in claim 1, wherein the common documentation beam path further comprises a camera that records the image data.

12. The device as claimed in claim 1, wherein the middle optical element arranged between the two outer optical elements has no optical effect.

13. The device as claimed in claim 1, wherein the middle optical element arranged between the two outer optical elements has a beam-attenuating effect.

14. The device as claimed in claim 1, further comprising a display that incouples data, images or information opposite the common documentation beam path.

15. The device as claimed in claim 14, wherein the optical element having a beam-splitting effect, respectively located in the observation beam path, incouples the data, images or information.

16. The device as claimed in claim 1, further comprising spectrally-dependent filters arranged in the observation beam path and/or in the documentation beam path that are selectively insertable into the observation beam path or the documentation beam path.

17. The device as claimed in claim 16, wherein the spectrally-dependent filters are arranged on a filter wheel or other changer, which has a motorized drive.

18. The device as claimed in claim 1, further comprising fixed and/or variable stops arranged in the observation beam path and/or in the documentation beam path that are selectively insertable into the observation beam path and/or in the documentation beam path.

19. The device as claimed in claim 18, wherein the fixed and/or variable stops are arranged on a wheel or other changer, which has a motorized drive.

20. The device as claimed in claim 1, wherein the three optical components are structured as a monolithic block having correspondingly necessary optically effective surfaces.

* * * * *

UNITED STATES PATENT AND TRADEMARK OFFICE
CERTIFICATE OF CORRECTION

PATENT NO. : 11,513,331 B2
APPLICATION NO. : 16/652179
DATED : November 29, 2022
INVENTOR(S) : Koschmieder et al.

It is certified that error appears in the above-identified patent and that said Letters Patent is hereby corrected as shown below:

In the Specification

In Column 3, Line 8, delete "embodiment" and insert -- embodiment of --, therefor.

Signed and Sealed this
Twentieth Day of June, 2023

Katherine Kelly Vidal
*Director of the United States Patent and Trademark Office*